(12) United States Patent
Chung

(10) Patent No.: US 8,827,319 B2
(45) Date of Patent: Sep. 9, 2014

(54) GAS TUBE STRUCTURE

(76) Inventor: Chiu-Chih Chung, Chunghua Hsien (TW)

( * ) Notice: Subject to any disclaimer, the term of this patent is extended or adjusted under 35 U.S.C. 154(b) by 189 days.

(21) Appl. No.: 13/430,889

(22) Filed: Mar. 27, 2012

(65) Prior Publication Data
US 2013/0255819 A1    Oct. 3, 2013

(51) Int. Cl.
*F16L 27/08* (2006.01)
(52) U.S. Cl.
USPC ............ 285/276; 285/272; 285/275; 285/278
(58) Field of Classification Search
USPC ...................... 285/272, 275, 276, 277, 278
See application file for complete search history.

(56) References Cited

U.S. PATENT DOCUMENTS

| | | | | |
|---|---|---|---|---|
| 3,877,734 A | * | 4/1975 | Brozek | 285/249 |
| 3,900,221 A | * | 8/1975 | Fouts | 285/276 |
| 4,804,206 A | * | 2/1989 | Wood et al. | 285/13 |
| 5,553,893 A | * | 9/1996 | Foti | 285/147.1 |
| 6,742,815 B2 | * | 6/2004 | McCurdy et al. | 285/276 |
| 7,661,722 B2 | * | 2/2010 | Tarquini et al. | 285/249 |

* cited by examiner

*Primary Examiner* — James Hewitt
(74) *Attorney, Agent, or Firm* — Jackson IPG PLLC

(57) ABSTRACT

A gas tube structure includes a flexible tube. The end of the flexible tube is connected with a fixed connector. A sleeve is fitted on the fixed connector. The fixed connector and the sleeve are connected to a movable connector. The fixed connector has a connection section extending from an outer end thereof. The connection section has an annular seal groove and an annular buckle groove thereon. The sleeve has a sleeve hole therein, a stop flange at one end thereof and an engaging groove formed on in inner wall thereof. One end of the movable connector has a receiving hole and a C-shaped groove formed on an outer wall of the receiving hole. The C-shaped groove is adapted to receive a C-shaped buckle. The present invention has a stable connection, is safe for use, can lower the cost and enhances assembly efficiency.

4 Claims, 7 Drawing Sheets

GAS TUBE STRUCTURE

BACKGROUND OF THE INVENTION

1. Field of the Invention

The present invention relates to a gas tube structure, and more particularly to a gas tube for connection of a metallic gas tube, a gas barrel, a gas stove or a water heater. The gas tube is used to connect the metallic gas tube/gas barrel and the gas stove/water heater.

2. Description of the Prior Art

A soft gas tube is used to connect a metallic gas tube/gas barrel and a gas stove/water heater. For lock, the end of soft gas tube is rotatable. In U.S. Pat. No. 5,553,893 as shown in FIG. 5, the end of a flexible tube 10 is provided with a fastening ring 20. The fastening ring 20 is connected with a fixed connector 30. The fixed connector 30 is connected with a movable connector 40. The flexible tube 10 includes a metallic tube layer 11, a metallic net layer 12 and a plastic tube layer 13 which are stacked from inside to outside in sequence. The fastening ring 20 is made of metal. The fixed connector 30 is made of metal and has a central through hole 31. The inner end of the fixed connector 30 is welded to the end of the flexible tube 10. The outer end of the fixed connector 30 has a connection section 32. The connection section 32 has a groove 33 and a plurality of seal grooves 34. The groove 33 is adapted to receive a C-shaped buckle 35. The seal grooves 34 are adapted to receive seal rings 36. Each seal ring 36 has a circular cross-section. The movable connector 40 has a central hole 41. One end of the central hole 41 has a receiving hole 42, a fastening groove 43 formed in the receiving hole 42. The other end of the movable connector 40 has a lock section 44 to connect the connector of the gas stove and the water heater.

The C-shaped buckle 35 is connected between the fixed connector 30 and the movable connector 40. The C-shaped buckle 35 has a gap, which may be deformed easily and is not strong enough. The C-shaped buckle 35 may be pulled away by accident, so it is not safe for use. The fastening ring 20 is welded to the fixed connector 30 to form a weld point A. This way consumes manpower and increases cost. The weld point is exposed to result in a crack and cannot be used.

In U.S. Pat. No. 6,742,815 B2 as shown in FIG. 6, the metallic tube layer 11 extends in the fixed connector 30 to connect with the inner end of the movable connector 40. The plastic tube layer 13 is fixed to the outer edge of the distal end of the fixed connector 30 by the fastening ring 20. The C-shaped buckle 35 is used to connect the movable connector 40. This structure is complicated and is difficult to assemble. Accordingly, the inventor of the present invention has devoted himself based on his many years of practical experiences to solve these problems.

SUMMARY OF THE INVENTION

The primary object of the present invention is to provide a gas tube structure. An end of a flexible tube is connected with a fixed connector. A sleeve is fitted on the fixed connector. The fixed connector and the sleeve are connected to a movable connector. The flexible tube includes a metallic tube layer, a metallic net layer and a plastic tube layer. The fixed connector has a central through hole. The inner end of the fixed connector is welded to the end of the metallic tube layer. A fastening ring is connected with the metallic net layer and fitted on the inner end of the fixed connector. The plastic tube layer covers the fastening ring. The fixed connector has a connection section extending from an outer end thereof. The connection section has an annular seal grooves thereon to receive a seal ring and an annular buckle groove at a distal end thereof to receive a buckle ring. The sleeve has a sleeve hole therein, a stop flange at one end thereof, and an engaging groove formed on in inner wall thereof. The movable connector has a central hole therein. One end of the central hole has a receiving hole. A C-shaped groove is formed on an outer wall of the receiving hole. The C-shaped groove is adapted to receive a C-shaped buckle. An outer end of the movable connector has a lock section to connect with the connector of a gas stove or a water heater.

For connection of the fixed connector and the movable connector, the sleeve is connected with the inner end of the movable connector. By engagement of the engaging groove and the C-shaped buckle, the sleeve and the movable connector can be rotated. The distal end of the connection section of the fixed connector is provided with the buckle ring. The sleeve has the stop flange extending from the sleeve hole. When the sleeve is inserted, the buckle ring provides a stop to the stop flange so that the movable connector can be rotated at the outer end of the fixed connector. The present invention has a stable connection which will not deform or loosen and is safe for use.

BRIEF DESCRIPTION OF THE DRAWINGS

FIG. 4-B is a schematic view showing the movable connector of the present invention after rotated.

DETAILED DESCRIPTION OF THE PREFERRED EMBODIMENTS

Embodiments of the present invention will now be described, by way of example only, with reference to the accompanying drawings.

Figure 1:
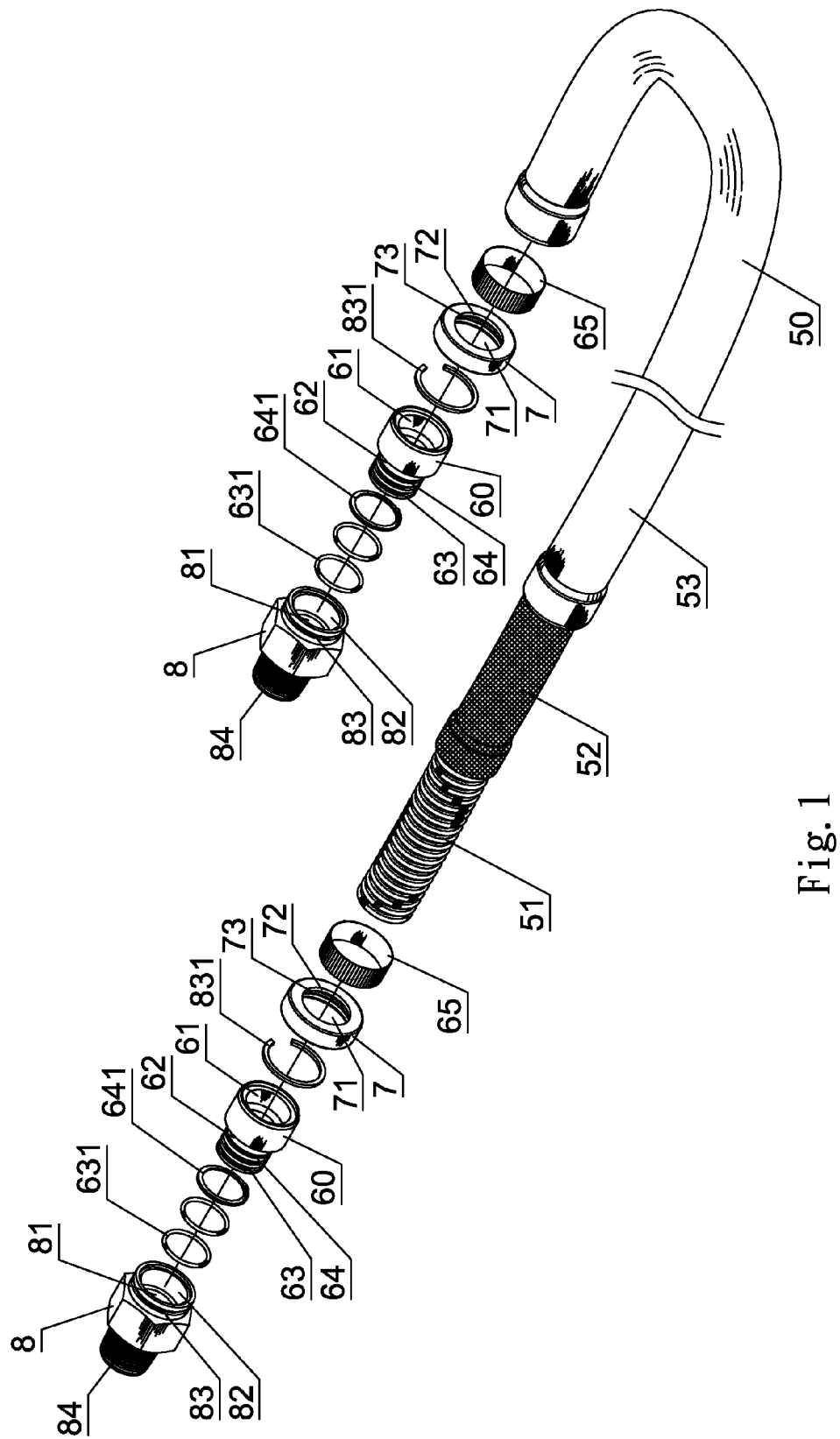
FIG. 1 is an exploded view of the present invention.
Figure 2:
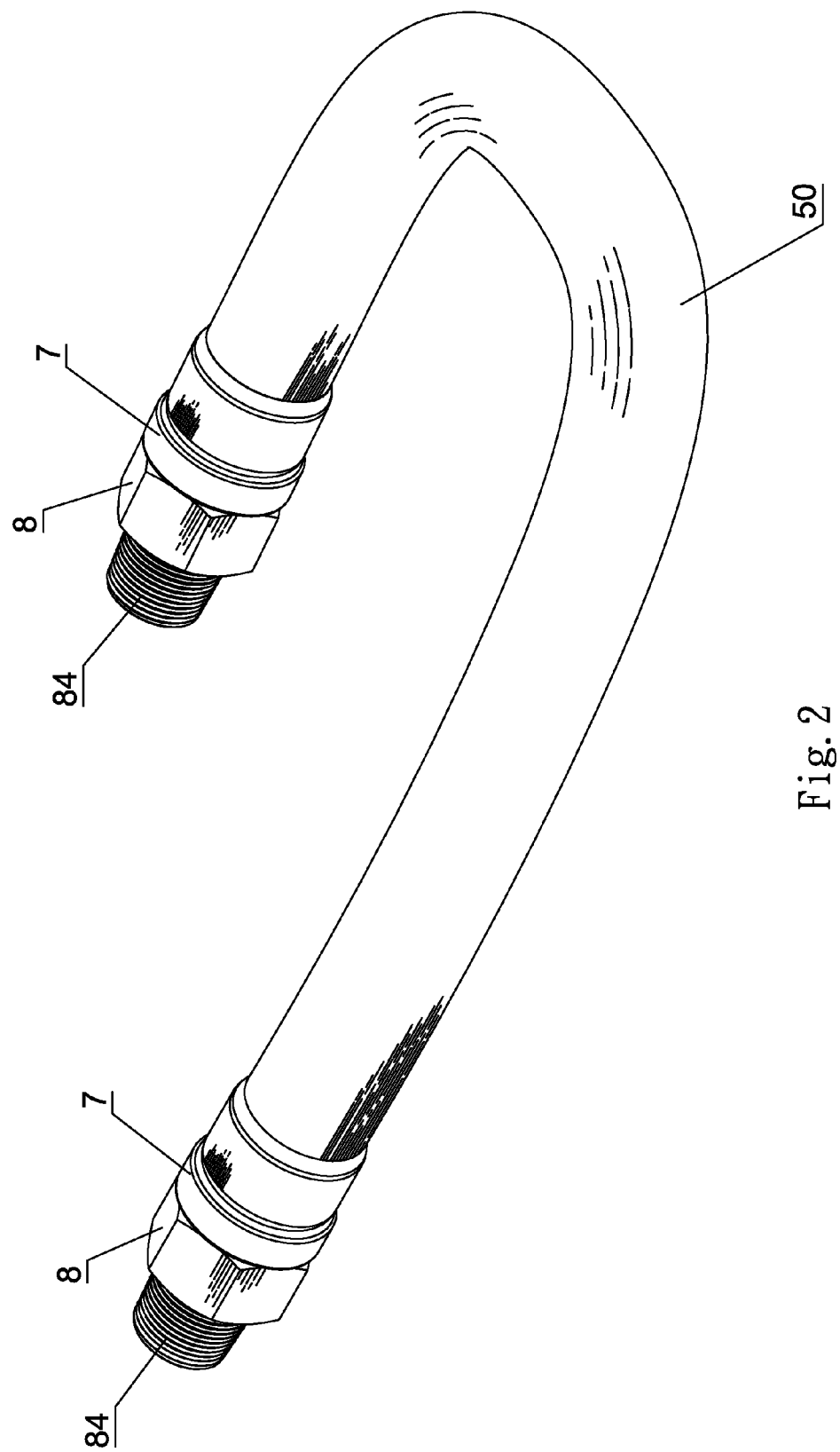
FIG. 2 is a perspective view of the present invention.
Figure 3:
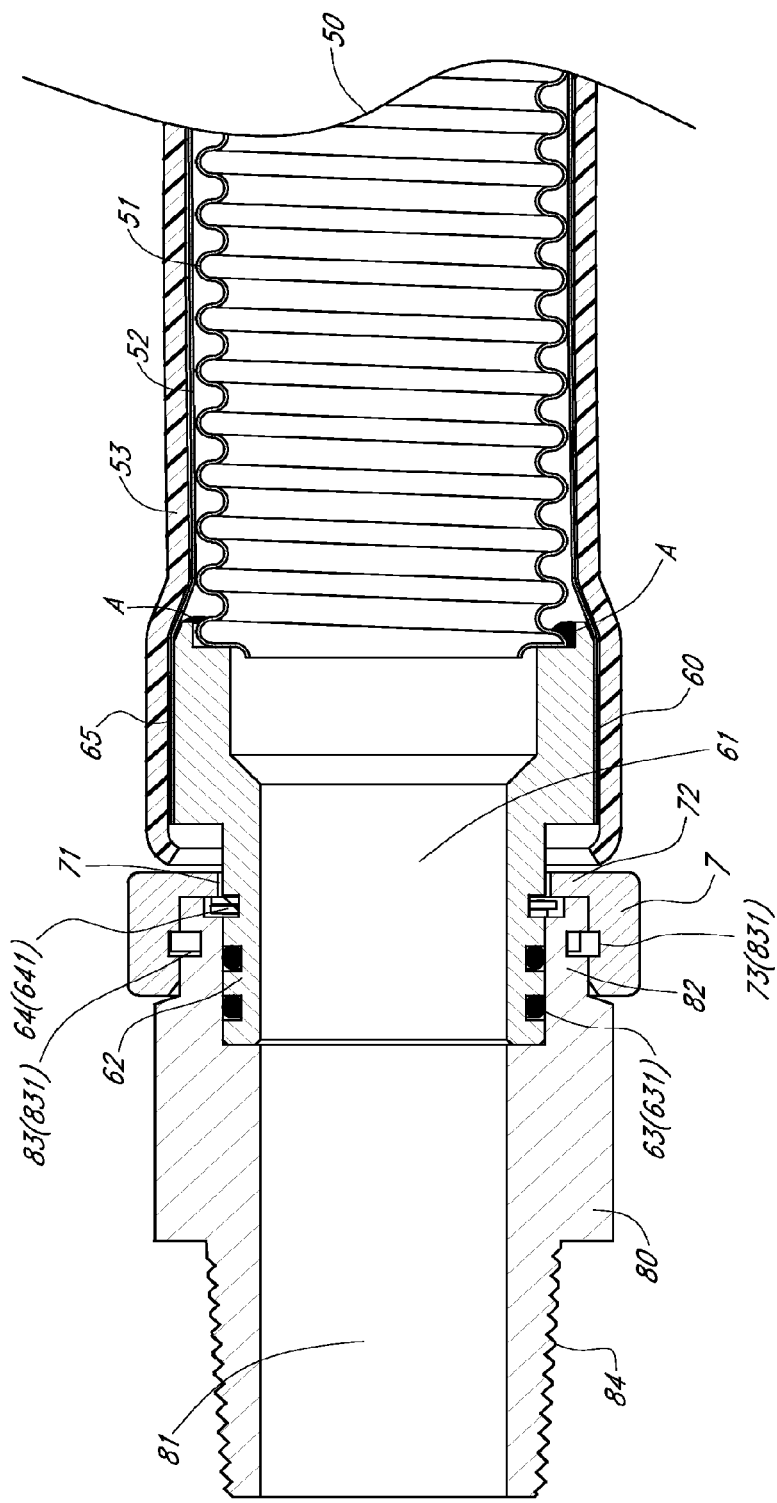
FIG. 3 is a sectional view of the present invention.

As shown in FIG. 1 through FIG. 3, the end of a flexible tube 50 is connected with a fixed connector 60. A sleeve 7 is fitted on the fixed connector 60. The fixed connector 60 and the sleeve 7 are connected to a movable connector 80. The flexible tube 50 includes a metallic tube layer 51, a metallic net layer 52 and a plastic tube layer 53 which are stacked from inside to outside in sequence. The fixed connector 60 is made of metal. The fixed connector 60 has a central through hole 61. The inner end of the fixed connector 60 is welded to the end of the metallic tube layer 51 to form a weld point A. A fastening ring 65 is connected with the metallic net layer 52 and fitted on the inner end of the fixed connector 60. The plastic tube layer 53 covers the fastening ring 65 to be one-piece. The fixed connector 60 has a connection section 62 extending from an outer end thereof. The connection section 62 has one or a plurality of annular seal grooves 63 thereon to receive seal rings 631 and an annular buckle groove 64 at a distal end thereof to receive a buckle ring 641. The sleeve 7 has a sleeve hole 71 therein, a stop flange 72 at one end thereof, and an engaging groove 73 formed on in inner wall thereof. The movable connector 80 has a central hole 81 therein. One end of the central hole 81 has a receiving hole 82. A C-shaped groove 83 is formed on an outer wall of the receiving hole 82. The C-shaped groove 83 is adapted to receive a C-shaped buckle 831. An outer end of the movable connector 80 has a lock section 84 to connect with the connector of a gas stove or a water heater.

Figure 4A:
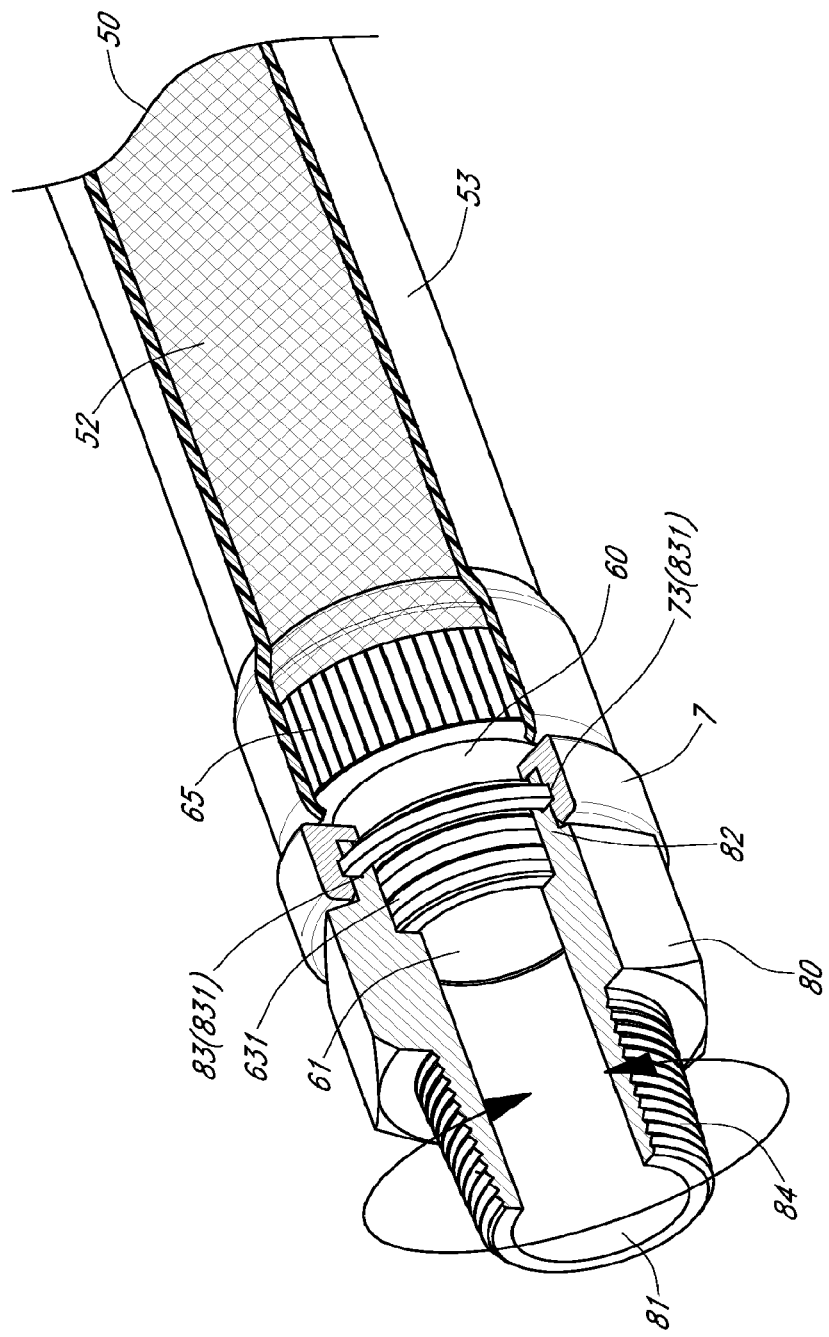
FIG. 4-A is a schematic view showing the movable connector of the present invention before rotated.
Figure 4B:
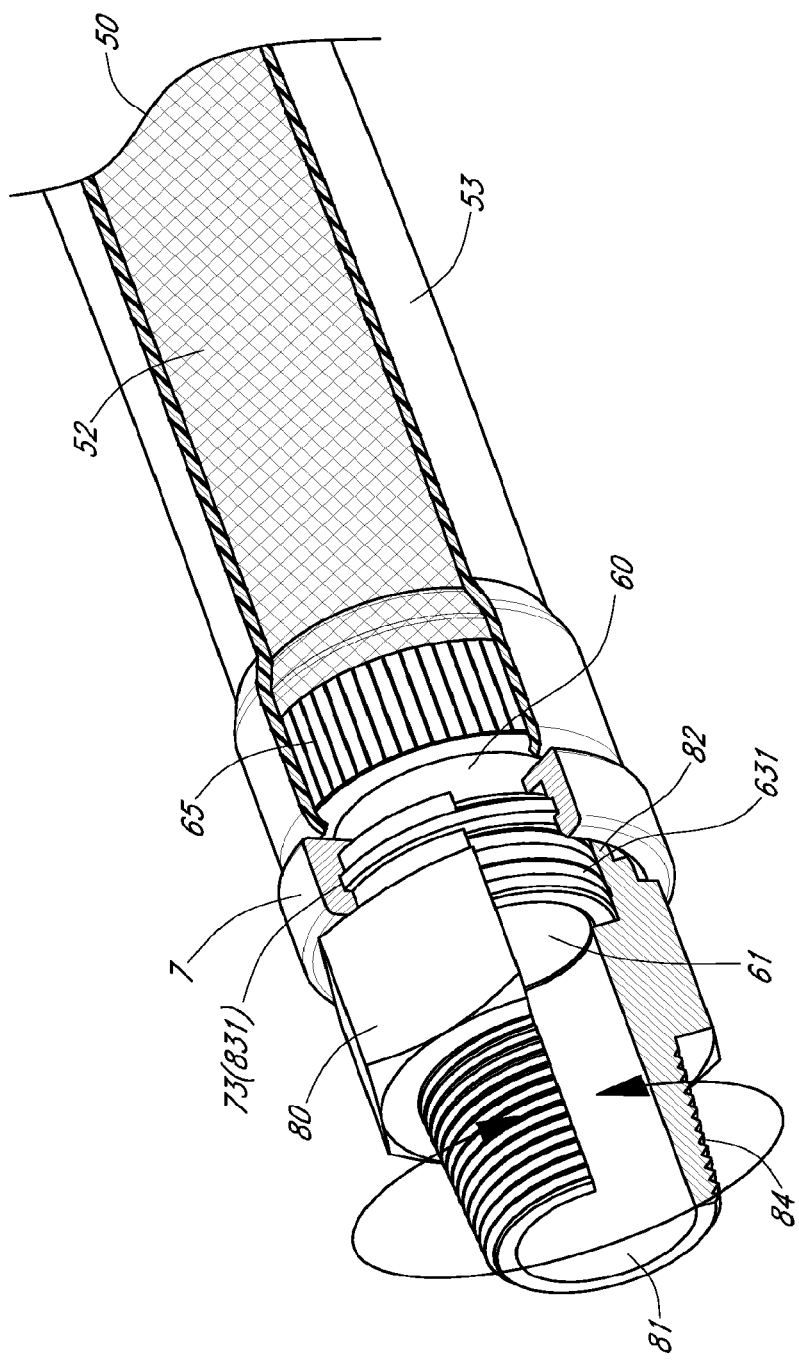
Figure 5:
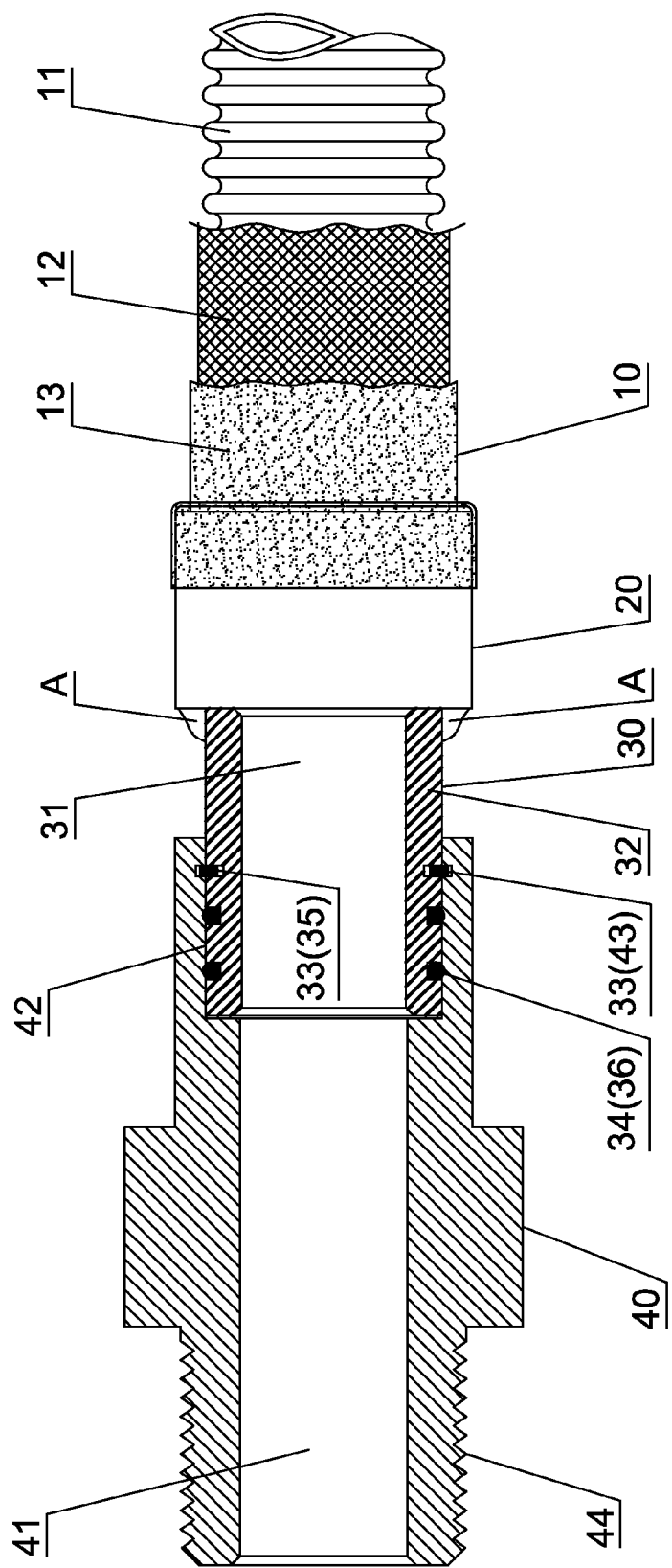
FIG. 5 is a sectional view of a conventional gas tube.
Figure 6:
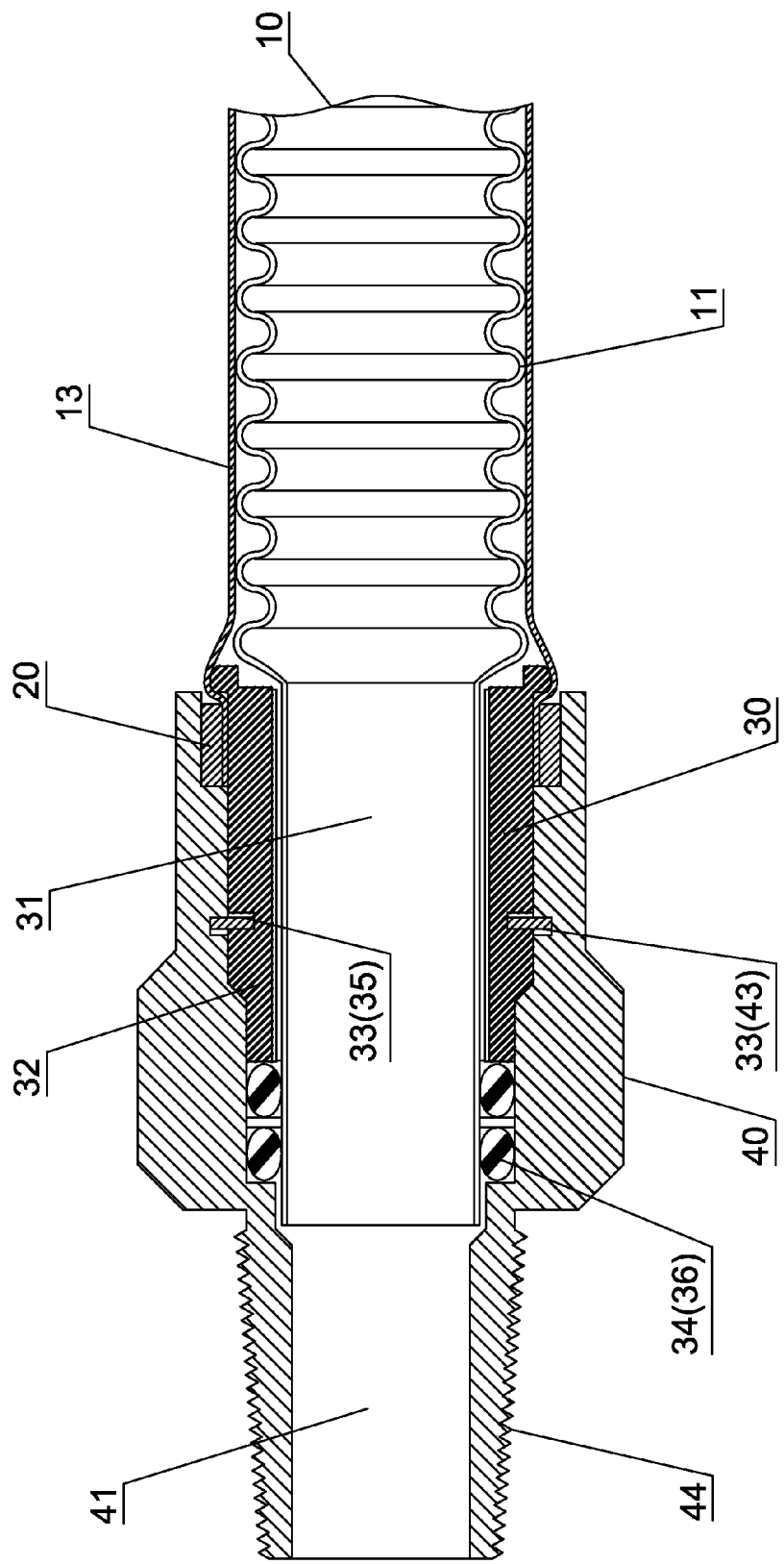
FIG. 6 is a sectional view of another conventional gas tube.

As shown in FIG. 3, FIG. 4-A and FIG. 4-B, the seal rings 631 are respectively received in the annular seal grooves 63. The buckle ring 641 is received in the annular buckle groove 64 of the fixed connector 60. The C-shaped buckle 831 is received in the C-shaped groove 83 of the movable connector 80. The fixed connector 60 is inserted in the sleeve hole 71 of the sleeve 7. The stop flange 72 of the sleeve 7 cooperates with the buckle ring 641, so the sleeve 7 can be rotated at the position of the buckle ring 641 and won't disengage from the moveable connector 80. The inner end of the fixed connector 60 is welded to the end of the metallic tube layer 51, and the fastening ring 65 is connected with the metallic net layer 52 and fitted on the inner end of the fixed connector 60. The plastic tube layer 53 covers the fastening ring 65 to protect the weld point A so as to enhance its connection. The connection section 62 of the fixed connector 60 is inserted in the receiving hole 82 of the movable connector 80, so that the seal rings 631 are against the inner wall of the receiving hole 82 to achieve a seal effect. The sleeve 7 is connected with the inner end of the movable connector 80. By engagement of the engaging groove 73 and the C-shaped buckle 831, the sleeve 7 and the movable connector 80 can be rotated at the end of the fixed end 60 to connect with the connector of the gas stove or water heater.

Although particular embodiments of the present invention have been described in detail for purposes of illustration, various modifications and enhancements may be made without departing from the spirit and scope of the present invention. Accordingly, the present invention is not to be limited except as by the appended claims.

What is claimed is:

1. A gas tube structure comprising
a flexible tube, the flexible tube including a metallic tube layer, a metallic net layer and a plastic tube layer which are stacked in sequence,
one end of the flexible tube being connected with a fixed connector, a sleeve fitted on the fixed connector, the fixed connector and the sleeve being connected to a movable connector, the fixed connector being made of metal, the fixed connector having a central through hole, an inner end of the fixed connector being welded to an end of the metallic tube layer, a fastening ring connected with the metallic net layer and fitted on the inner end of the fixed connector, the fixed connector having a connection section extending from an outer end thereof, the connection section having an annular seal groove thereon to receive a seal ring and an annular buckle groove at a distal end thereof to receive a buckle ring,
the sleeve having a sleeve hole therein, a stop flange at one end thereof and an engaging groove formed on an inner wall thereof,
the movable connector having a central hole therein, one end of the central hole having a receiving hole, a C-shaped groove formed on an outer wall of the receiving hole, the C-shaped groove being adapted to receive a C-shaped buckle, an outer end of the movable connector having a lock section to connect with a connector of a gas stove or a water heater, the seal ring being received in the annular seal groove, the buckle ring being received in the annular buckle groove of the fixed connector, the C-shaped buckle being received in the C-shaped groove of the movable connector,
the fixed connector being inserted in the sleeve hole of the sleeve, the stop flange of the sleeve cooperating with the buckle ring of the fixed connector, the connection section of the fixed connector being inserted in the receiving hole of the movable connector, the seal ring being against an inner wall of the receiving hole, the sleeve being connected with an inner end of the movable connector with engagement of the engaging groove and the C-shaped buckle.

2. The gas tube structure as claimed in claim 1, wherein the plastic tube layer covers the fastening ring.

3. The gas tube structure as claimed in claim 1, wherein the fixed connector is provided with a plurality of seal rings.

4. The gas tube structure as claimed in claim 1, wherein the connection section has a plurality of annular seal grooves thereon.

* * * * *